Patented Feb. 11, 1947

2,415,777

UNITED STATES PATENT OFFICE 2,415,777

PRODUCTION OF ALIPHATIC ACIDS FROM SULPHITE WASTE LIQUOR

Charles Weizmann, London W. C. 1, England, assignor to Butacet Limited, London, England No Drawing. Application March 22, 1943, Serial No. 480,094. In Great Britain April 11, 1941

13 Claims. (Cl. 195—47)

This invention relates to the utilization of waste liquors, namely those commonly called sulphite waste liquors.

The disposal of sulphite waste liquor is one of the major problems of the paper and artificial silk industry, as constituents thereof are likely to be converted by certain bacteria into evil smelling and/or poisonous substances. Various processes have been devised for its disposal. One such process comprises the alcoholic fermentation of sulphite liquor by means of yeast. Other processes involve the destruction of the carbohydrates present without converting them into useful products. The various methods proposed are not entirely satisfactory, (a) because of the technical difficulties involved, and (b) because of the fact that the pentoses of the liquor which are utilized by the undesired bacterial flora, cannot be fermented by means of yeast.

The object of the present invention is to provide an improved process for the utilization of sulphite waste liquor.

The invention consists in a process for the utilization of sulphite waste liquors, namely, by the production of aliphatic acids therefrom, wherein sulphite waste liquor is fermented by cultures prepared from soils in which have been cultivated beet-root, sugar-beet, carrots and the like, this fermentation following treatment of the liquor with a small amount of sulphuric acid to render the liquor more easily fermentable by the soil culture.

The invention also consists in a process according to the preceding paragraph having one or more of the following additional or specific features, namely, (a) the sulphite liquor is enriched in easily fermentable carbohydrates by the addition of starchy materials or sugar prior to fermentation; (b) the soil culture is acclimatized to sulphite liquor by growing successive generations thereof on ordinary culture media, to which increasing amounts of acid-treated sulphite liquor are added.

The invention also consists in improved processes for the utilization of sulphite waste liquors, namely, by the production of aliphatic acids therefrom substantially as herein described with reference to the several examples.

For preparing the culture of the soil bacteria, in active state, for use in this invention, the following method is very suitable (this being described in my copending application 433,093, filed March 2, 1942, and in my British application 4856/41):

*Method for the production of a soil culture (bacteria of the butyricus group)*

5 parts of fresh soil from a beetroot bed is passed through a sieve of suitable mesh, mixed thoroughly with 10 parts calcium carbonate, and added to a mash prepared from 10 parts rice bran and 90 parts water, which has been heated at 120° C. for two hours and cooled down to room temperature. One brings the inoculum again to a temperature of 100° C. for two minutes, cools quickly, and incubates for two days at 37° C. The mash ferments actively, and is then ready for use. Inocula from sugar beet soil, carrot soil and the like may be prepared in the same manner. A further increase in activity can be obtained and the reproducibility of the results can be improved upon by purifying the soil culture by means of plating it out on a suitable solid medium, e. g. yeast-dextrose-agar, isolating single colonies and propagating them in the usual manner.

The purification by this method, however, results usually in a loss of vigour. This can be restored by adding yeast autolysate to the mash. Obviously, on purification the bacterium or the mixture of bacteria loses its power to degrade protein to the necessary amino-acids.

With regard to the isolation and propagation of single colonies apart from testing them by results, it may be noted that in general the strains of bacteria so obtained form slender rods, and spatulate and capitate sporangia resembling tennis rackets or drum sticks. In this respect the organism is similar to *Clostridium pectinovorum*, recently studied in detail by Weizmann and Hellinger (Journal of Bacteriology, 40, 665, 1940) but it is differentiated from it by the complete absence of proteolytic power. The mashes must, therefore, contain low-molecular protein.

In this way part of the proteolytic power of the original soil culture is lost, so that it is advisable to add under these circumstances to the mash low-molecular proteins, such as autolysed yeast. Such a procedure is preferable if a substantially pure butyric acid fermentation is desired (i. e. a fermentation giving substantially only butyric and acetic acid). From a technical point of view, however, it appears preferable to use the original soil culture, as described above, and preferably acclimatized to sulphite waste liquor.

This culture is then preferably acclimatized by successively growing again and again, in further amounts of such mash, to which successively increasing amounts of sulphite waste liquor have been added.

The main organisms in the culture, effective in the present invention, cultured as above described are spore-forming bacteria.

The following examples illustrate how the invention may be carried into effect:

Example 1

1000 parts sulphite liquor were treated with 5.5 parts concentrated sulphuric acid for 3 hours at 140° C. The liquid was neutralized with ammonia and after addition of 50 parts calcium carbonate and 5 parts rice bran—which together with the ammonium sulphate formed constitutes the source of nitrogen for the bacteria, inoculated with a 2 days' old soil culture, prepared from beetroot soil. After a lag period of 6 to 10 hours, fermentation set in; it is completed in 3 days' time at 37° C. The resulting product was acidified with sulphuric acid, and filtered; the acids formed were then isolated in form of a colorless aqueous solution by distillation. Calculated as butyric acid, the total acidity of the distillate amounted to 27.3 parts, and the fermented liquid still contained 3.6 parts not-fermented sugar. An analysis of the acids showed that they consist of:

|  | Per cent |
|---|---|
| Butyric acid | 35 |
| Propionic acid | 17 |
| Acetic acid | 48 |

From the total acidity and from the aforesaid analysis the actual amounts of the individual analysis are obtained as follows per 1000 parts of sulphite liquor:

$$\text{Butyric acid} = \frac{27.3}{88} \times 0.35 \times 88 = 9.6$$

$$\text{Propionic acid} = \frac{27.3}{88} \times 0.17 \times 74 = 3.9$$

$$\text{Acetic acid} = \frac{27.3}{88} \times 0.48 \times 60 = 8.9$$

In the above equations 88, 74 and 60 are respectively the molecular weights of butyric, propionic and acetic acid.

Example 2

1000 parts acid-treated sulphite liquor (as in Example 1) was neutralized with ammonia and after addition of 100 parts rice-bran (containing 50% starch, 4% pentosans) and 30 parts calcium carbonate autoclaved for 2 hours at 120° and inoculated with 50 parts soil culture, which may be prepared as above. The fermentation proceeded at 37° C. without noticeable lag period. The fermentation product was acidified with dilute sulphuric acid, and the precipitate filtered and thoroughly washed. The solution was sugar-free; volume 2500 parts. The amount of volatile acids formed (calculated as butyric acid) was 36.65 parts, as compared with 100 parts reducing sugar plus starch in the mash. Ducleux-distillation showed that the acidic product consisted of 76.7% buytric acid, 3.7% propionic acid and 19.6% acetic acid.

Example 3

100 parts molasses of 50% sugar-content (calculated as glucose) and 10 parts rice-bran were substituted for the 100 parts of rice bran in Example 2. The total volume of the acidified fermentation product was 1560 parts; and 1.32 parts sugar (calculated as glucose) remained unfermented. The amount of acid formed (calculated as butyric acid) was 35.55 parts, as compared with 102 parts sugar present in the initial mash. The composition of the acids formed was 10.7% butyric acid, 36.8% propionic acid and 52.5% acetic acid.

Example 4

1000 parts sulphite liquor and 50 parts maize meal (starch content 65%) were processed in the same manner as in Example 1. The total volume of the fermentation product was 1500 parts, it contained no sugar and 29.03 parts acids (calculated as butyric acid). The usual analytical method showed that the acids consisted of 69.7% butyric acid, 30.3% acetic acid and practically no propionic acid.

General

Apparently in the above process the reducing sugars of the sulphite liquor and a part of the non-reducing higher-molecular carbohydrates present, either free or chemically linked to the lignin, are converted into useful products, namely a mixture of fatty acids (butyric, propionic and acetic acid). Sulphite liquor as it is obtained in manufacturing processes, is not practically or economically capable of fermentation by the soil culture (or by pure strains of butylic or butyric organisms). It has, however, been observed that treating the sulphite liquor with a small amount of sulphuric acid in combination with heating, as shown above, makes it easily fermentable by the soil culture both in its crude form and after purification through single colonies. The conditions of this treatment may be varied in a wide range, but it is found advantageous to use an amount of sulphuric acid which makes the percentages of this acid in the total liquid 1% and to heat for 3 hours at 140° C., corresponding to a pressure of 4 atm. The resulting liquid is then neutralized by means of ammonia or calcium carbonate or both. A fair excess of calcium carbonate is added so as to neutralize continually the acids formed in the fermentation process. By "fair excess" of calcium carbonate or the like I mean an amount equal to about 1 to 3 times that sufficient to neutralize the acids expected from the bacterial fermentation. The calcium sulphate formed in the neutralization in the above examples need not be removed before fermentation. It is, as well as the sludge which is formed during these operations, useful in providing the bacteria with the solid surface they require for their activities.

While the amount of reducing sugar in the liuqor is not markedly increased by the acid treatment (the specimen to which the above example relates contained originally 4.15% reducing sugar (calculated as glucose) and after the treatment 0.0%), the non-reducing carbohydrates (including the pentoses mentioned above) are made, at least partly, biologically available, possibly by severing the bonds between them and the lignin. Thus the observation can be explained that the amount of fatty acids formed is much higher than that expected on the basis of the reducing sugar (and starch if added) present before the fermentation (40% of the weight of the reducing sugar is the "theoretically" expected quantity).

The fatty acids are obtained by this process in form of an aqueous solution of their calcium or like salts and can be isolated and separated. The waste sulphite liquor before fermentation may be enriched by other fermentable materials, such as hydrolyzed-wood, hydrolyzed straw or, preferably, molasses, rice, maize, wheat, rice bran, wheat bran and the like, as the soil culture is capable of fermenting solutions more concentrated in sugar than the liquor itself.

A further increase in activity can be obtained and the reproducibility of the results be improved upon, by purifying the soil culture by means of plating it out on a suitable solid medium, e. g. yeast-dextrose-agar, isolating single colonies and propagating them in the usual manner. It is useful to acclimatize the soil culture to sulphite liquor by subculturing it on ordinary media, adding increasing amounts of acid-treated sulphite liquor.

I claim:

1. A process for the utilization of sulphite waste liquors, by the production of aliphatic acids therefrom, which consists in treating the liquor with a small amount of sulphuric acid and then fermenting the acid-treated liquor by a culture of spore-forming bacteria of the butyricus group, which bacteria are normal in garden soil in which a root crop selected from the group consisting of beet-root, sugar-beet and carrots has been cultivated.

2. A process for the utilization of sulphite waste liquors, by the production of aliphatic acids therefrom, which consists in treating the liquor with a small amount of sulphuric acid, enriching the liquor by the addition of an easily fermentable carbohydrate selected from the group consisting of starch and sugar, and then fermenting the resulting liquor by a culture of bacteria of the butyricus group, such culture being prepared from garden soil in which a root crop selected from the group consisting of beet-root, sugar-beet and carrots has been cultivated.

3. A process for the utilization of sulphite waste liquors, by the production of aliphatic acids therefrom, which consists in treating the liquor with a small amount of sulphuric acid and then fermenting the acid-treated liquor by a culture of bacteria of the butyricus group, such culture being prepared from garden soil in which a root crop selected from the group consisting of beet-root, sugar-beet and carrots has been cultivated, which bacterial culture has been acclimatized to sulphite liquor by growing successive generations of it on culture media, to which successively increasing amounts of acid-treated sulphite liquor have been added.

4. A process for the utilization of sulphite waste liquors, by the production of aliphatic acids therefrom, which process consists in treating the liquor with a small amount of sulphuric acid, enriching the liquor by the addition of easily fermentable carbohydrate selected from the group consisting of starch and sugar and then fermenting the resulting liquor by a culture of bacteria of the butyricus group, which culture has been prepared from garden soil in which a root crop selected from the group consisting of beet-root, sugar beet and carrots has been cultivated, which bacterial culture has been acclimatized to sulphite waste liquor by growing successive generations thereof on a culture medium to which successively increasing amounts of such acid treated sulphite waste liquor have been added.

5. In the fermentation of sulphite waste liquor, the process which comprises adding sufficient sulfuric acid to a sulphite waste liquor to produce a concentration of about 1 per cent of sulfuric acid therein, heating the mixture to a temperature of about 140° C. for about 3 hours, neutralizing the treated liquor, enriching the liquor by adding a fermentable material selected from the group consisting of starch and sugar, and then fermenting the liquor with the aid of a culture of bacteria of the butyricus group, which culture has been prepared from a soil in which beets have been cultivated.

6. The process of claim 5 wherein said liquor is neutralized by the addition of calcium carbonate in excess.

7. The process of claim 1 wherein said acid treated liquor is neutralized before the fermentation step.

8. The process of claim 1 wherein the concentration of acid employed is about 1 per cent based on the liquor.

9. The process of claim 2 wherein said liquor is neutralized prior to the fermenting step.

10. The process of claim 2 wherein the concentration of sulfuric acid employed is about 1 per per cent based on the liquor.

11. A process for the utilization of sulphite waste liquor by the production of aliphatic acids therefrom, which consists in treating the liquor with a small amount of sulphuric acid, and then fermenting the acid-treated liquor by a bacterial culture prepared from soil in which a root crop selected from the group consisting of beet-root, sugar-beet and carrots has been cultivated.

12. A process as claimed in claim 5, wherein the acidulated sulphite waste liquor is at least partly neutralized by adding ammonia thereto, and adding calcium carbonate in excess thereto.

13. A process which comprises adding sulphuric acid to sulphite waste liquor, in such amount as to bring the sulphuric acid content of such liquor to about 1%, heating such acidified liquor to about 140° C. under superatmospheric pressure, adding nitrogenous material capable of serving as nutrient material for bacteria and adding calcium carbonate in excess to said liquor.

CHARLES WEIZMANN.

REFERENCES CITED

The following references are of record in the file of this patent:

UNITED STATES PATENTS

| Number | Name | Date |
|---|---|---|
| 1,400,852 | Backhaus | Dec. 20, 1921 |
| 1,625,732 | Le Franc | Apr. 19, 1927 |
| 1,867,946 | Hutchinson | July 19, 1932 |
| 1,952,642 | Wallace | Mar. 27, 1934 |